United States Patent
Koo et al.

(10) Patent No.: US 9,646,361 B2
(45) Date of Patent: May 9, 2017

(54) INITIALIZATION INDEPENDENT APPROACHES TOWARDS REGISTRATION OF 3D MODELS WITH 2D PROJECTIONS

(71) Applicant: Siemens Healthcare GmbH, Erlangen (DE)

(72) Inventors: Yuehaw Koo, Princeton, NJ (US); Ankur Kapoor, Plainsboro, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 54 days.

(21) Appl. No.: 14/965,144

(22) Filed: Dec. 10, 2015

(65) Prior Publication Data

US 2016/0171649 A1 Jun. 16, 2016

Related U.S. Application Data

(60) Provisional application No. 62/090,053, filed on Dec. 10, 2014.

(51) Int. Cl.
- *G06K 9/00* (2006.01)
- *G06T 3/00* (2006.01)
- *G06T 7/33* (2017.01)

(52) U.S. Cl.
CPC ............ *G06T 3/0068* (2013.01); *G06T 7/344* (2017.01); *G06T 2207/10081* (2013.01);
(Continued)

(58) Field of Classification Search
None
See application file for complete search history.

(56) References Cited

U.S. PATENT DOCUMENTS 6,195,445 B1 * 2/2001 Dubuisson-Jolly ..... G06T 7/246
382/107
7,831,090 B1 * 11/2010 Krishnan ........... G06K 9/00214
345/419

(Continued)

*Primary Examiner* — Hadi Akhavannik

(57) ABSTRACT

A method of registering a 3-dimensional (3D) model of a coronary artery tree with 2-dimensional (2D) images includes solving for matrices R, $P_i$, i=1, ..., N, that minimize a cost function $\Sigma_{i=1}^{N}\|\Psi_i RX - I_i P_i\|_{2,1}$ subject to constraints that R$\in$conv(SO(3)), $P_i \in [0,1]^{n_i \times m}$, and $P_i 1 \leq 1$, $1^T P_i = 1$, for i$\in\{1, N\}$, where N is a number of 2D images, R is a rotation matrix, conv(SO(3)) denotes a convex hull of the special orthogonal group in 3 dimensions, X denotes a 3D centerline model of a coronary artery tree, $I_i$ denotes the ith 2D image, $\Psi_i$ denotes a transformation between the 3D centerline model X and the ith 2D image $I_i$, 1 is an all-ones vector, $P_i$ is a permutation matrix, and rounding a solution R to a nearest orthogonal matrix R* in SO(3), where R* aligns the 3D centerline model X of the coronary artery tree with 2D fluoroscopic images acquired during a percutaneous coronary intervention procedure.

21 Claims, 7 Drawing Sheets

(52) U.S. Cl.
CPC .............. *G06T 2207/10121* (2013.01); *G06T 2207/30048* (2013.01); *G06T 2207/30101* (2013.01); *G06T 2207/30172* (2013.01)

(56) References Cited

U.S. PATENT DOCUMENTS

| | | | | |
|---|---|---|---|---|
| 2013/0094745 A1* | 4/2013 | Sundar | ................... | G06T 3/0068 |
| | | | | 382/132 |
| 2013/0181711 A1* | 7/2013 | Chaari | ................ | G01R 33/5611 |
| | | | | 324/309 |
| 2013/0322723 A1* | 12/2013 | Akhbardeh | ............ | A61B 6/032 |
| | | | | 382/131 |
| 2015/0112182 A1* | 4/2015 | Sharma | ................ | A61B 5/0261 |
| | | | | 600/408 |

* cited by examiner

| Patient | [0°, 10°] | [10°, 20°] | [20°, 40°] | [40°, 60°] | [60°, 90°] |
|---|---|---|---|---|---|
| (1) DA290911 | 7 (3.7) | 6 (4.5) | 3 (3.9) | 2 (4.8) | 4 (6.3) |
| (2) DA211112 | 4 (4.2) | 7 (4.3) | 5 (6.6) | 0 (NA) | 3 (6.7) |
| (3) DA081112 | 3 (6.8) | 3 (6.7) | 0 (NA) | 1 (6.3) | 0 (NA) |
| (4) DA080611 | 5 (3.1) | 6 (3.5) | 5 (4.2) | 1 (4.2) | 4 (4.4) |
| (5) DA060612 | 1 (6.1) | 3 (6.5) | 1 (9.1) | 1 (8.7) | 0 (NA) |
| (6) DA051011 | 3 (4.7) | 3 (3.6) | 3 (4.5) | 0 (NA) | 1 (2.8) |

Table 1

FIG. 6

INITIALIZATION INDEPENDENT APPROACHES TOWARDS REGISTRATION OF 3D MODELS WITH 2D PROJECTIONS

CROSS REFERENCE TO RELATED UNITED STATES APPLICATIONS

This application claims priority from "INITIALIZATION INDEPENDENT APPROACHES TOWARDS REGISTRATION OF 3D MODEL WITH 2D PROJECTIONS", U.S. Provisional Application No. 62/090,053 of Khoo, et al., filed Dec. 10, 2014, the contents of which are herein incorporated by reference in their entirety.

TECHNICAL FIELD

This application is directed to the registration of 2D digital images with 3D digital models.

DISCUSSION OF THE RELATED ART

Coronary heart disease (CHD) is a disease in which plaque builds up inside the coronaries and restricts the flow of blood to heart muscles and is a leading of death. For patients with advanced CHD, a procedure such as angioplasty or coronary artery bypass graft (CABG) surgery may be needed. The traditional surgical approach of CABG requires opening the chest wall or incisions between ribs to operate on the heart. The nonsurgical approach of percutaneous coronary intervention (PCI), commonly known as angioplasty, is performed by the introduction of a thin, flexible tube with a device on the end via arterial access, usually the femoral artery. To guide and position the device accurately, X-ray fluoroscopy is the modality of choice. A contrast injection is used intermittently that outlines the vessels and any blockages.

Advancements in catheter design and intraoperative imaging have allowed PCI to be performed on patients with multi-vessel disease and more complicated lesions with high success rates. However, it remains challenging to treat patients with Chronic Total Occlusion (CTO) due to the complete nature of their blockage. By definition a chronic total occlusion is a blockage of the artery that has reduced the blood flow essentially completely (>99% stenosis) and has been present for more than 3 months. The occlusion blocks the propagation of the contrast agent, which renders the occluded portion of the vessel and beyond invisible under fluoroscopy. The inability to see the course of the vessel at the site of occlusion, and often the longer lesions, make reliably crossing a CTO with a coronary guidewire challenging and is the most common reason for a CTO PCI to fail. Percutaneous coronary intervention for CTO is also associated with a significant use of catheterization laboratory resources, with procedure times and fluoroscopic times being twice as long as those for PCI for non-CTO lesions.

The benefit of performing a pre-operative computed tomography angiography (CTA) is well documented and is becoming a standard of care. The performance characteristics of CTA with blood pool contrast injection enables the calcifications causing the CTOs to be clearly distinguished, as opposed to what can be perceived with interventional X-ray fluoroscopy with direct contrast agent injection. Coronary CTA may allow better determination of calcification, lesion length, stump morphology, definition of post-CABG anatomy, and presence of side branches compared to angiography alone. High acquisition speeds and high spatial resolution also add value in determining parameters relevant to planning.

The integration of pre-operative images with intra-operative images is a known strategy in image guidance to provide additional visual information to the cardiac interventionalist during the procedure. In case of PCI, a 3D model of the vessels can be extracted pre-procedure from the acquired volume, aligned with the 2D fluoroscopic views, and overlaid on top of the live fluoroscopy images, thereby augmenting the interventional images. However, achieving this alignment is a challenge in itself, mainly because finding inter modal correspondence is a nontrivial task, and also because of the nonlinear aspect of the underlying optimization task. Nevertheless, 2D/3D registration methods have the potential to greatly reduce the uncertainty relative to interventional X-ray angiography, and to do so with only minimal modification to the existing clinical flows.

The related topic of coronary artery reconstruction requires establishing accurate correspondences between detected landmarks and features on the 2D fluoroscopic images and matching them with an estimate of a 3D model. Thus method for 2D/3D registration can be applied to coronary artery reconstruction, which in turn can enable applications such as in-silico computation of fractional flow reserve. From a broader perspective, 2D/3D registration methods have numerous other applications in fields such as neurology, orthopedics, and cardiology.

SUMMARY

Exemplary embodiments of the disclosure as described herein generally include systems and methods for 2D/3D registration based on a convex optimization program, and applied to the registration of a 3D centerline model of the coronary arteries with a pair of fluoroscopic images. The optimization programs according to embodiments jointly optimize the correspondence between points and their projections and the transformation. Since the optimization is convex, it enables an efficient search of global optima regardless of initialization using standard off-the-shelf conic programming software.

According to an embodiment of the disclosure, there is provided a computer implemented method of registering a 3-dimensional (3D) model of a coronary artery tree with two or more 2-dimensional (2D) images, the method including solving for matrices $R, P_i, i=1, \ldots, N$, that minimize a cost function $\Sigma_{i=1}^{N}\|\Psi_i R X - I_i P_i\|_{2,1}$ subject to constraints that $R \in \mathrm{conv}(SO(3))$, $P_i \in [0,1]^{n_i \times m}$, and $P_i 1 \leq 1$, $1^T P_i = 1$, for $i \in \{1, \ldots N\}$, where N is a number of 2D images, R is a rotation matrix, $\mathrm{conv}(SO(3))$ denotes a convex hull of the special orthogonal group in 3 dimensions, X denotes a 3D centerline model of a coronary artery tree with m points, $I_i$ denotes the ith 2D image with $n_i$ points, $\Psi_i$ denotes a transformation between the 3D centerline model X and the ith 2D image $I_i$, 1 is an all-ones vector, $P_i$ is a permutation matrix whose values represent a probability of a point in the ith 2D image $I_i$ corresponding to a point in the 3D centerline model X, and the subscript 2,1 refers to a mixed $l^2/l_1$ norm, rounding a solution R to a nearest orthogonal matrix $R^*$ in $SO(3)$, wherein $R^*$ aligns the 3D centerline model X of the coronary artery tree with 2D fluoroscopic images acquired during a percutaneous coronary intervention procedure.

According to a further embodiment of the disclosure, rounding a solution R to a nearest orthogonal matrix $R^*$ in $SO(3)$ comprises finding a matrix $R^*$ in $SO(3)$ that solves $\mathrm{argmin}_{R \in O(3)} \|R - \tilde{R}\|_F^2$, wherein $\tilde{R}$ is an optimal rotation in conv(SO(3)), O(3) denotes the orthogonal group in 3D, and the subscript F denotes a Frobenius norm.

According to a further embodiment of the disclosure, the cost function includes terms $\|X^F - I_i^F P_i\|_{2,1}$, for $i=1, \ldots, N$, wherein $X^F$ denotes a d×m real matrix that represents a d-dimensional transformation invariant feature, and $I_i^F$ denotes a d×$n_i$ image.

According to a further embodiment of the disclosure, the cost function includes terms $\|\Psi R X^F - I_i^F P_i\|_{2,1}$ for $i=1, \ldots, N$, wherein $X^F$ denotes a d×m real matrix that represents a d-dimensional transformation invariant feature, and $I_i^F$ denotes a d×$n_i$ image.

According to a further embodiment of the disclosure, the cost function includes a term $\Sigma_{ab=1}^M \|P_{ab} - \hat{P}_{ab}\|_1$, wherein $\hat{P}_{ab}$ denotes a correspondence of points between 2D images $I_a$ and $I_b$ where $\hat{P}_{ab}(i, j)=1$ if point $i \in I_a$ corresponds to point $j \in I_b$ and zero otherwise, $P_{ab}$ is a permutation matrix that relates the points of images $I_a$ and $I_b$ for M image pairs, and $\|\;\|_1$ is an entry-wise $l^1$ norm, subject to additional constraints $$P_{ab} \in [0,1]^{n_a \times n_b}, P_{ab}1 \leq, 1^T P_{ab} \leq 1,$$

and $$\begin{bmatrix} I_{n_a} & P_{ab} & P_a \\ P_{ab}^T & I_{n_b} & P_b \\ P_a^T & P_b^T & I_m \end{bmatrix} \succcurlyeq 0.$$

According to a further embodiment of the disclosure, the method includes using a solution for the cost function as an initialization to search locally for a more optimal solution.

According to another embodiment of the disclosure, there is provided a computer implemented method of registering a 3-dimensional (3D) model of a coronary artery tree with two or more 2-dimensional (2D) images, the method including receiving a 3D centerline model X of a coronary artery tree with m points and N 2D images $I_i$, $i=1, \ldots, N$, each with $n_i$ points, concatenating coordinates of point $j \in X$ with coordinates of subsequent points $j+1, \ldots, j+n_p-1$, and coordinates of point $k \in I_i$ with coordinates of subsequent points $k+1, \ldots, k+n_p-1$, to form a patches of size $n_p$, wherein results of the concatenations are denoted as $X_i^P$, $I_i^P$ and $I_2^P$ and stored as an i-th column of matrices $X^P \in R^{3n_p \times m}$ and $I_i \in R^{3n_p \times n_i}$, $i=1, \ldots, N$, wherein R is the set of real numbers, solving for matrices R, $P_i$, $i=1, \ldots, N$, that minimize a cost function $\Sigma_{i=1}^N \|(I_{n_p} \otimes \Psi_i R) X^P - I_i^P P_i\|_{2,1}$ subject to constraints that $R \in conv(SO(3))$, $P_i \in [0,1]^{n \times m}$, and $P_i 1 \leq 1$, $1^T P_i = 1$, for $i \in \{1, N\}$, wherein $\otimes$ denotes a Kronecker product, R is a rotation matrix, conv(SO(3)) denotes a convex hull of the special orthogonal group in 3 dimensions, $\Psi_i$ denotes a transformation between $X^P$ and $I_i^P$, 1 is an all-ones vector, $P_i$ is a permutation matrix whose values represent a probability of a point in $I_i^P$ corresponding to a point in $X^P$, and the subscript 2,1 refers to a mixed $l^2/l_1$ norm, and rounding a solution R to a nearest orthogonal matrix R* in SO(3), wherein R* aligns the 3D centerline model X of the coronary artery tree with 2D fluoroscopic images acquired during a percutaneous coronary intervention procedure.

According to a further embodiment of the disclosure, rounding a solution R to a nearest orthogonal matrix R* in SO(3) comprises finding a matrix R* in SO(3) that solves $\operatorname{argmin}_{R \in O(3)} \|R - \tilde{R}\|_F^2$, wherein $\tilde{R}$ is an optimal rotation in conv(SO(3)), O(3) denotes the orthogonal group in 3D, and the subscript F denotes a Frobenius norm.

According to a further embodiment of the disclosure, $n_p = 3$.

According to a further embodiment of the disclosure, the cost function includes a term $\Sigma_{ab=1}^M \|P_{ab} - \hat{P}_{ab}\|_1$, wherein $\hat{P}_{ab}$ denotes a correspondence of points between 2D images $I_a$ and $I_b$ where $\hat{P}_{ab}(i, j)=1$ if point $i \in I_a$ corresponds to point $j \in I_b$ and zero otherwise, $P_{ab}$ is a permutation matrix that relates the points of images $I_a$ and $I_b$ for M image pairs, and $\|\;\|_1$ is an entry-wise $l^1$ norm, subject to additional constraints $$P_{ab} \in [0,1]^{n_a \times n_b}, P_{ab}1 \leq, 1^T P_{ab} \leq 1, \text{ and}$$

$$\begin{bmatrix} I_{n_a} & P_{ab} & P_a \\ P_{ab}^T & I_{n_b} & P_b \\ P_a^T & P_b^T & I_m \end{bmatrix} \succcurlyeq 0.$$

According to a further embodiment of the disclosure, the method includes, if the point spacing differs between X and $I_i$, projecting a randomly posed 3D model using $\Psi_i$, calculating an average spacing between two subsequent points in the projection, and sampling image points in $I_i$ according to this spacing.

According to another embodiment of the disclosure, there is provided a non-transitory program storage device readable by a computer, tangibly embodying a program of instructions executed by the computer to perform the method steps for registering a 3-dimensional (3D) model of a coronary artery tree with two or more 2-dimensional (2D) images.

BRIEF DESCRIPTION OF THE DRAWINGS

FIG. 6 shows that the pose can be recovered to within 10 mm for most cases, either before or after OGMM refinement, according to an embodiment of the disclosure.

DETAILED DESCRIPTION OF EXEMPLARY EMBODIMENTS

Figure 1A:
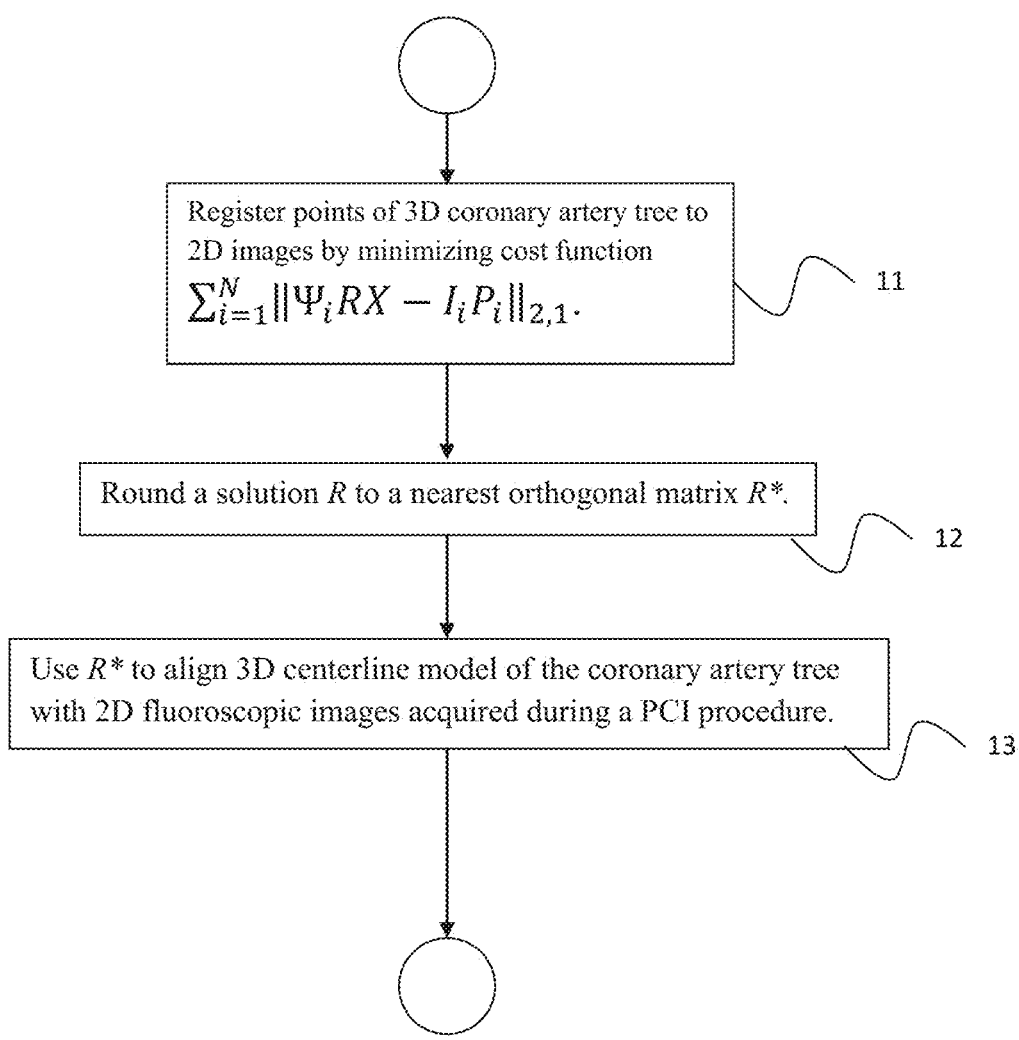
FIGS. 1A and 1B are flow charts of methods for 2D/3D registration based on a convex optimization program, according to an embodiment of the disclosure.

Exemplary embodiments of the disclosure as described herein generally provide systems and methods for 2D/3D registration based on a convex optimization program. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

As used herein, the term "image" refers to multi-dimensional data composed of discrete image elements (e.g., pixels for 2-dimensional images and voxels for 3-dimensional images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the disclosure are not limited to such images, and can be applied to images of any dimension, e.g., a 2-dimensional picture or a 3-dimensional volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Exemplary embodiments of the disclosure can provide globally optimal correspondence and transformation. Typically point-set registration involves a two-step procedure that first determines the point correspondences and then the transformation, such as the Iterative-Closet-Point (ICP) algorithm. Other approaches use probabilistic mixture models such as a Gaussian mixture model to establish implicit correspondence. In either case, one cannot be certain whether such procedure locates a global optimizer. According to embodiments of the disclosure, two convex programs are provided for rigid 2D/3D point-set registration of a 3D model and multiple 2D images that not only jointly optimize the correspondences and transformation, but are also convex, which enables an efficient search of global optimizer regardless of initialization using standard off-the-shelf conic programming software.

Exemplary embodiments of the disclosure can provide an exact recovery of transformation irrespective of initialization: The original 2D/3D alignment formulation is in general NP-hard due to binary permutation matrices. Under certain conditions, relaxed convex programs according to embodiments of the disclosure will give a solution to the original mixed-integer task. In the noiseless situation when some permutation of projected points exactly matches the transformed 3D model, the unknown rotation R can be correctly recovered globally over its domain.

Exemplary embodiments of the disclosure can provide point consistency between multiple images: A program according to an embodiment is a variant of 2D/3D registration that can estimate of point correspondences between multiple 2d images. Such correspondences could come from feature matching, or by exploiting epipolar constraints. A natural extension of this program is the consideration of descriptors of a particular point as additional terms in an objective function of the program. The tangency of the vessel in the local neighborhood of the point can be used to illustrate the use of point descriptors. These descriptors aid in resolving ambiguities in permutation matrices and ensure consistency in point correspondences. Such resolution of ambiguity can help reconstruct vessels from 2D projections.

Notation

This disclosure uses upper case letters such as A to denote matrices, and lower case letters such as t for vectors. $I_d$ denotes an identity matrix of size d×d. The diagonal of a matrix A is denoted by diag(A). $A^n$ is used for integer n≥1 to denote the multiplication of A with itself for n times. This disclosure will frequently use block matrices built from smaller matrices, in particular when addressing EQ. (1.2), below. For some block matrix A, $A_{ij}$ will denote its (i, j)-th block, and A(p, q) will denote its (p, q)-th entry. $A_i$ will denote the i-th column of A. When there is an index set $s=\{s_1, \ldots, s_n\}$, $A_s$ will denote the matrix $[A_{s_1}, \ldots, A_{s_n}]$. A ≽ 0 will mean that A is positive semidefinite, that is, $u^T Au \geq 0$ for all u. SO(3) will denote the special orthogonal group (matrices) in $R^3$. $\|x\|_2$ will denote the Euclidean norm of $x \in R^n$, where n will usually be clear from the context, and will be pointed out if this is not so. The trace of a square matrix A will be denoted by Tr(A). This disclosure uses the following matrix norms. The Frobenius, mixed $l^2/l_1$ and entry-wise $l_1$ norms are defined as:

$$\|A\|_F = Tr(A^T A)^{1/2}, \|A\|_{2,1} = \Sigma_i \|A_i\|_2, \text{ and}$$

$$\|A\|_1 = \Sigma_i \Sigma_j |A(i,j)|.$$

The Kronecker product between matrices A and B is denoted by $A \otimes B$. The all-ones vector is denoted by 1, and the dimension will be clear from the context. For two real numbers a, b with a≤b, [a, b] denotes the closed interval between a and b. |s| denotes the number of elements in a set s. For a set s, conv(s) denotes the convex hull of s.

This disclosure introduces the following sets:

$$\Pi_d^{a \times b} = \{A \in \{0,1\}^{a \times b} | \Sigma_{i=1}^a A(i,j)=1, \Sigma_{j=1}^b A(i,j)=1, \},$$

$$\Pi_l^{a \times b} = \{A \in \{0,1\}^{a \times b} | \Sigma_{i=1}^a A(i,j)=1, \Sigma_{j=1}^b A(i,j) \leq 1, \},$$
and $$\Pi^{a \times b} = \{A \in \{0,1\}^{a \times b} | \Sigma_{i=1}^a A(i,j) \leq 1, \Sigma_{j=1}^b A(i,j)=1, \},$$

which will be referred to hereinbelow as, respectively, permutation, left permutation and sub-permutation matrices. Note that in each case, A is an a×b matrix whose elements are between 0 and 1.

Background Information

A 3D centerline representation of a coronary artery tree, segmented from a preoperative CTA volume, is to be registered to two or more fluoroscopic images. An observed 3D model according to an embodiment of the disclosure can be described by matrix $X \in R^{3 \times m}$, with m points. The transformations between the 3D space and the projected images, represented by $\Psi_i$, where i is the ith projection image, are known from the calibration of the X-ray apparatus. The projection operator maps the 3D model to a degenerate point cloud $I_i \in R^{3 \times n_i}$ for ith projection image. Degenerate means that the affine rank of $I_i$ is two. Without loss of generality, embodiments assume that $n_i \geq m$. A 2D/3D registration task according to an embodiment of the disclosure is to find an alignment matrix R, in the special orthogonal group SO(3), that matches some permutation of the observed 3D model with each of the degenerate projections.

Task Statement

Formally, according to embodiments of the disclosure, the 2D/3D registration task can be solved using the following cost function:

$$\min_{R \in SO_3, P_i \in \Pi_l^{n_i \times m}} \Sigma_{i=1}^N \|\Psi_i RX - I_i P_i\|_{2,1} \quad (1.1)$$

where $P_i$, $i=1, \ldots, N$, are some left permutation matrices defined above, and $\|\ \|_{2,1}$ is the mixed $l^2/l^1$ norm. Intuitively, the cost function minimization in EQ. (1.1) ensures by subsampling and permuting $I_i$ that image points should be roughly equal to the projections of the 3D model X posed by some rotation R. When an image is provided, it is not known a priori the correspondences, which are encoded in $P_i$ for each of N given images, and the rotation R. These correspondences can be found by solving EQ. (1.1). In EQ. (1.1), the use of the unsquared norm may reject outliers that are challenging to register. Alternatively, according to other embodiments, a maximum likelihood estimation framework with Gaussian type noise can use a squared Frobenius norm $\|\ \|_F^2$ instead.

Embodiments of the disclosure can solve for a variant of EQ. (1.1). It is possible that a priori to registration, the correspondences of the points between the two images are known. Such correspondences can come from feature matching, or by exploiting the epipolar constraints. This basically means that $P_i$ should be optimized dependently to preserve correspondences between the images. Let the correspondence of points between $I_a$ and $I_b$ be denoted by $\hat{P}_{ab}$, where $\hat{P}_{ab}(i,j)=1$ if point i in $I_a$ corresponds to point j in $I_b$ and zero otherwise. According to an embodiment, when there are ambiguous correspondences, e.g., each row or column of $\hat{P}_{ab}$ has more than one nonzero entry, the rotation R can be obtained by solving the following cost function:

$$\min_{R \in SO_3, (P_i, P_{ab}) \in S} \sum_{i=1}^{N} \|\Psi_i RX - I_i P_i\|_{2,1} + \sum_{ab=1}^{M} \|P_{ab} - \hat{P}_{ab}\|_1, \quad (1.2)$$

where $P_{ab}$ is the permutation matrix that relates the points of $I_a$ and $I_b$ for M image pairs, and $\|\ \|_1$ is the entry-wise $l^1$ norm. The domain of optimization S will be made clear below. According to embodiments, solving EQ. (1.2) is also useful for estimating the correspondence between the M image pairs directly for reconstruction purpose.

Note that for simplicity of notation, only two images are considered hereinbelow in this disclosure. It will be apparent to those of skill in the art how to consider multiple images in EQS. (1.1) and (1.2) by adding more terms to the cost function as indicated above. A solution according to embodiments can be easily extended to such cases. In addition, EQS. (1.1) and (1.2) both have nonconvex domains of integer matrices and rotation matrices, which are notoriously challenging to solve. According to embodiments of the disclosure, these domains are formally defined and convex relaxations are presented which can recover exact solutions under certain conditions.

Domains for Permutation Matrices

A more formal way to understand EQS. (1.1) and (1.2) is the following: Suppose there is a ground truth 3D model with n points which is described by the coordinate matrix $X_{All} \in R^{3 \times m}$. An observed 3D model according to an embodiment can be described by matrix $X \in R^{3 \times m}$. Assume $n_1$, $n_2$, $m \le m'$. In this case, $$I_1 = \Psi_1 R X_{all} Q_1, I_2 = \Psi_2 R X_{all} Q_2, X = X_{all} Q_3,$$

where R, $\Psi_1$, $\Psi_2$, $I_1$, $I_2$ are matrices as introduced as before, $Q_1 \in \Pi_l^{m' \times n_1}$, $Q_2 \in \Pi_l^{m' \times n_2}$, and $Q_3 \in \Pi_l^{m' \times m}$. Here, $\Pi_l^{a \times b}$ for integers $a \ge b$ denotes the following set of matrices:

$$\Pi_l^{a \times b} = \{A \in \{0,1\}^{a \times b} | \Sigma_{i=1}^{a} A(i,j) = 1, \Sigma_{j=1}^{b} A(i,j) \le 1\}$$

According to embodiments, $Q_1$, $Q_2$, $Q_3$ can be intuitively regarded as operators that generate the images and the observed model by sub-sampling and permuting the points in ground truth 3D model $X_{all}$. For example, if the ith row of $Q_1$ is zero, then it means the ith point of $X_{all}$, or more precisely, ith column of $X_{all}$, is not selected to be in $I_1$.

According to embodiments, it can be assumed, that if a point i in $X_{all}$, the i-th column of $X_{all}$, is contained in X, then the projections of point i corresponds to some columns of $I_1$, $I_2$. Loosely speaking, it means the observed 3D model X is a subset of the point clouds $I_1$, $I_2$. In this case, $P_1 = Q_1^T Q_3 \in \Pi_l^{n_1 \times m}$ and $P_2 = Q_2^T Q_3 \in \Pi_l^{n_2 \times m}$ are known. Furthermore, if a point i of $X_{all}$ is not selected by $Q_1$, meaning $\Sigma_j Q_1(i,j) = 0$, then $Q_1 Q_1^T \in R^{n \times n}$ is almost an identity matrix $I_n$, except it is zero for the ith diagonal entry (similarly for $Q_2 Q_2^T$). These facts can be used after multiplying the EQS. (2) from the right by $Q_1^T Q_3$, $Q_2^T Q_3$ to get $$\Psi_1 RX = I_1 P_1, \Psi_2 RX = I_2 P_2.$$

If there is no noise in the image, the above equations should be strictly satisfied. If not, embodiments solve the optimization task EQ. (1.1).

To simultaneously estimate the correspondence $P_{12}$, let $P_{12} = Q_1^T Q_2$. When using the exact correspondence matrix $\hat{P}_{12}$ without ambiguity, then $$P_{12} = \hat{P}_{12}.$$

According to an embodiment, $P_1$, $P_2$, $P_{12}$ can be related through a new variable $$P \equiv [Q_1 Q_2 Q_3]^T [Q_1 Q_2 Q_3] \in R^{(n_1+n_2+m) \times (n_1+n_2+m)}.$$

In this context, the variables $P_1$, $P_2$ used in EQ. (1.1), along with $P_{12}$ are simply the off diagonal blocks of the variable P. Then the domain of $(P_1, P_2, P_{12})$ is simply $$S = \{(P_1, P_2, P_{12}): P \succeq 0, \text{rank}(P) \le n, P_{ii} = I_{n_i}, P_1 \in \Pi_l^{n_1 \times m}, P_2 \in \Pi_l^{n_2 \times m}, P_{12} \in \Pi_l^{n_1 \times n_2}\}$$

$P_{ii}$ may be understood as the diagonal blocks of P. According to embodiments, the optimization of EQ. (1.2) is solved when images or correspondences are noisy.

Convex Relaxation

Embodiments of the disclosure can provide two programs, which are the convex relaxations of EQS. (1.1) and (1.2). According to embodiments, the non-convex constraints that prevent these equations from being convex can be switched to convex constraints. These relaxations enable an efficient search of global optimums using standard convex programming packages. To solve the convex equations, embodiments use CVX from CVX Research, Inc., available at http://cvxr.com/cvx, a package based on interior point methods for specifying and solving convex programs. Before looking at each of the equations, embodiments introduce a characterization of the convex hull of SO(d) for any dimension d, in terms of positive semidefinite matrix. The d=3 version will be restated in the following theorem.

Theorem 1

$$\text{conv}(SO(3)) = \left\{ X \in R^{3 \times 3} : \begin{bmatrix} 1 - x_{11} - x_{22} + x_{33} & x_{13} + x_{31} & x_{12} - x_{21} & x_{23} + x_{32} \\ x_{13} + x_{31} & 1 + x_{11} - x_{22} - x_{22} & x_{23} - x_{32} & x_{12} + x_{21} \\ x_{12} - x_{21} & x_{23} - x_{32} & 1 + x_{11} + x_{22} + x_{33} & x_{31} - x_{13} \\ x_{23} + x_{32} & x_{12} + x_{21} & x_{31} - x_{13} & 1 - x_{11} + x_{22} - x_{33} \end{bmatrix} \succeq 0 \right\}.$$

This linear matrix inequality is convex and can be included in a semidefinite program. According to embodiments, for both equations (1.1) and (1.2), the domain of R is relaxed, which is SO(3) into conv(SO(3)). However, this relaxation alone is insufficient to transform EQS. (1.1), (1.2) into convex systems, and details of embodiments of a fully relaxed task are described in the next two subsections.

Relaxing EQ. (1.1)

According to an embodiment, EQ. (1.1) specifies a rotation to register a 3D model with the images. The points in the 3D model X and images $I_1$, $I_2$ should be matched after a permutation operation through the variables $P_1$, $P_2$. $P_1$, $P_2$ have their entries on the domain (0,1). It is challenging to optimize on a discrete domain. A typical way to address such challenges is by the following discrete-to-continuous relaxation, $$P_i \in \{0,1\}^{n_i \times m} \to P_i \in [0,1]^{n_i \times m},$$

for i=1, 2. The relaxed matrices $P_1$ and $P_2$ can be interpreted as probabilistic maps between the points in the images and the points in the 3D model. For example, the size of an entry $P_1(i, j)$ resembles the probability of point i in $I_1$ corresponding to point j in the 3D model.

According to an embodiment of the disclosure, a convexly relaxed program is introduced:

$$\min_{R,P_1,P_2} \|\Psi_1 RX - I_1 P_1\|_{2,1} + \|\Psi_2 RX - I_2 P_2\|_{2,1} \quad (2.1)$$

s.t. $R \in \text{conv}(SO(3))$, $P_i \in [0,1]^{n_i \times m}$, $P_i 1 \le 1, 1^T P_i = 1$, for $i \in \{1,2\}$.

Relaxing EQ. (1.2)

According to an embodiment of the disclosure, EQ. (1.2) includes an estimation of $P_{12}$, a correspondence between images $I_1$, $I_2$, in addition to pose estimation. According to embodiments, SO(3) and the integrality constraints are relaxed similarly to that of EQ. (1.1). However, different from EQ. (1.1), the set S has an extra rank requirement that prevents EQ. (1.2) from being convex. According to an embodiment, the rank constraint may be dropped.

According to an embodiment of the disclosure, a convexly relaxed program is introduced:

$$\min_{R,P_1,P_2} \|\Psi_1 RX - I_1 P_1\|_{2,1} + \|\Psi_2 RX - I_2 P_2\|_{2,1} + \|P_{ab} - \hat{P}_{ab}\|_1, \quad (2.2)$$

s.t. $R \in \text{conv}(SO(3))$, $P_i \in [0, 1]^{n_i \times m}$ for $i \in \{1, 2\}$, $P_i 1 \le 1, 1^T P_i = 1$ for $i \in \{1, 2\}$, $P_{12} \in [0, 1]^{n_1 \times n_2}$, $P_{12} 1 \le 1, 1^T P_{12} \le 1$, $$\begin{bmatrix} I_{n_1} & P_{12} & P_1 \\ P_{12}^T & I_{n_2} & P_2 \\ P_1^T & P_2^T & I_m \end{bmatrix} \succeq 0.$$

Rounding and Local Optimization

In general, it is not clear that the solution to EQS. (2.1) or (2.2) will be the solution to EQS. (1.1) and (1.2), as the search domain has been made less restrictive. Denote the optimal "rotation" in the domain conv(SO(3)) of both programs as $\tilde{R}$. As $\tilde{R}$ is not necessarily in SO(3), embodiments need to "round" $\tilde{R}$ to a point $R^*$ on SO(3). A strategy according to an embodiment of the disclosure finds the orthogonal matrix closest to $\tilde{R}$ in terms of a Frobenius norm, namely $$R^* = \text{argmin}_{R \in O(3)} \|R - \tilde{R}\|_F^2$$

where O(3) is the orthogonal group in 3D. For completeness the analytical expression is provided for $R^*$. Let the singular value decomposition (SVD) of $\tilde{R}$ be of the form $$\tilde{R} = U\Sigma V^T.$$

Then $$R^* = UV^T.$$

According to an embodiment, it is not necessary to enforce the special orthogonality constraint in the rounding procedure, since an element $\tilde{R}$ in conv(SO(3)) has positive determinant, hence the $UV^T$ obtained from the above procedure necessarily is in SO(3).

As in the case when the solutions of EQS. (2.1), (2.2) are not feasible for EQS. (1.1) and (1.2), embodiments use a rounding procedure to project $R^*$ to a nearest point in SO(3). Although it is possible to prove that $\|R^* - R_0\|$ is small, $R^*$ in general is still suboptimal in terms of the cost functions of the original nonconvex systems EQS. (1.1) and (1.2), as the rounding procedure does not consider optimizing any cost functions.

According to embodiments, an approximate solution from a convex relaxation can be used as an initialization to search locally for a more optimal solution. According to other embodiments, the OGMM algorithm of Dibildox, et al., "3D/3D Registration of Coronary CTA and Biplane XA Reconstructions for Improved Image Guidance", Medical Physics 41(9):091909, 2014, the contents of which are herein incorporated by reference in their entirety, can be used, which searches locally by optimizing a nonconvex cost function using a gradient-descent based method.

Additional Features

It is natural to think that including additional descriptors of a particular point can improve on the recovery of the transformation. According to an embodiment, additional terms in the cost functions of EQS. (1.1), (1.2) can encourage matching of transformation invariant features, or features transforming according to rotation.

To match transformation invariant features, embodiments add the following terms $$\|X^F - I_1^F P_1\|_{2,1} + \|X^F - I_2^F P_2\|_{2,1} \quad (3.1)$$

to the cost functions in EQS. (1.1) and (1.2), where $X^F \in \mathbb{R}^{d \times m}$; $I_1^F \in \mathbb{R}^{d \times n_1}$; $I_2^F \in \mathbb{R}^{d \times n_2}$ denote some d dimensional feature vectors for the points in the 3D model and the images.

According to embodiments, to deal with features that transform according to rotation, which include first order intensity information such as intensity gradient, the following terms are added to the cost:

$$\|\Psi_1 RX^F - I_1^F P_1\|_{2,1} + \|\Psi_2 RX^F - I_2^F P_2\|_{2,1}. \quad (3.2)$$

In this case the dimension d of the feature vectors is 3.

Constructing Features for Coronary Vessels

Although it could be beneficial to include local descriptors of points into the cost, feature extraction could add to the computational cost. Hence, for registering coronary vessels, embodiments use the idea of a patch and bypass the need for feature extraction. Note that typical features for vessels, such as the tangent of the vessel, can be extracted from the local neighborhood of a particular point. Therefore, according to embodiments, the coordinates of neighborhood points around each point, which is denoted as a patch, are used as the descriptor for each point. Usually data comes from vessel segmentation software that extracts the vessel centerline as a sequence of coordinates. According to an embodiment, the coordinate of point i is concatenated with the coordinate of subsequent points i+1, i+2, ..., i+$n_p$-1 to form a patch of size $n_p$. This concatenation is performed for both the 3D coronary artery tree and the 2D images. The results of such concatenations are denoted as $X_i^P$, $I_1^P$ and $I_2^P$ and stored as the i-th column of the matrices $X^P \in R^{3n_p \times m}$ and $I_1 \in R^{3n_p \times n_1}$; $I_2 \in R^{3n_p \times n_2}$. Now instead of registering points, embodiments register these patches of the 3D model to the images. The cost function in EQ. (1.1), when considering matching patches, becomes $$\|(I_{n_p} \otimes \Psi_1 R)X^P - I_1^P P_1\|_{2,1} + \|(I_{n_p} \otimes \Psi_2 R)X^P - I_2^P P_2\|_{2,1}, \quad (4.1)$$

and for EQ. (1.2) the cost function is $$\|(I_{n_p} \otimes \Psi_1 R)X^P - I_1^P P_1\|_{2,1} + \|(I_{n_p} \otimes \Psi_2 R)X^P - I_2^P P_2\|_{2,1} + \|P_{12} - \hat{P}_{12}\|_1. \quad (4.2)$$

Experiments have shown that $n_p = 3$ suffices to give a good enough solution.

A practical issue is that one needs to take care of the sampling density of the points on the centerline. If the point spacing is very different between X and $I_1$, $I_2$, the patches cannot be well matched. To deal with this issue, embodiments project a randomly posed 3D model using $\Psi_1$ and $\Psi_2$, calculate the average spacing between two subsequent points in the projection, and sample the image points $I_1$, $I_2$ according to this spacing. According to embodiments, this rough estimate is generally good enough.

Method Summaries

FIG. 1A is a flow chart of a method according to an embodiment of the disclosure of registering points of a 3D coronary artery tree to points in 2D images. A method begins at step 11 by minimizing the relaxed cost function, after receiving the 3D centerline model X of the coronary artery tree and 2 or more 2D images. The cost function may be the relaxed convex cost functions of EQS. (2.1) or (2.2), and may include the additional terms of EQS. (3.1) and (3.2). Note that the cost function need not be restricted to registering the 3D coronary artery tree to two 2D images, but can be extended to register the 3D coronary artery tree to N 2D images, and the cost function of EQ. (2.2) can be extended from one 2D image pair to including M pairs of corresponding 2D images. A solution R is rounded to a nearest orthogonal matrix R* in SO(3), at step 12, and the solution R* can be used at step 13 to align the 3D centerline model X of the coronary artery tree with new 2D fluoroscopic images acquired during a percutaneous coronary intervention procedure.

Figure 1B:
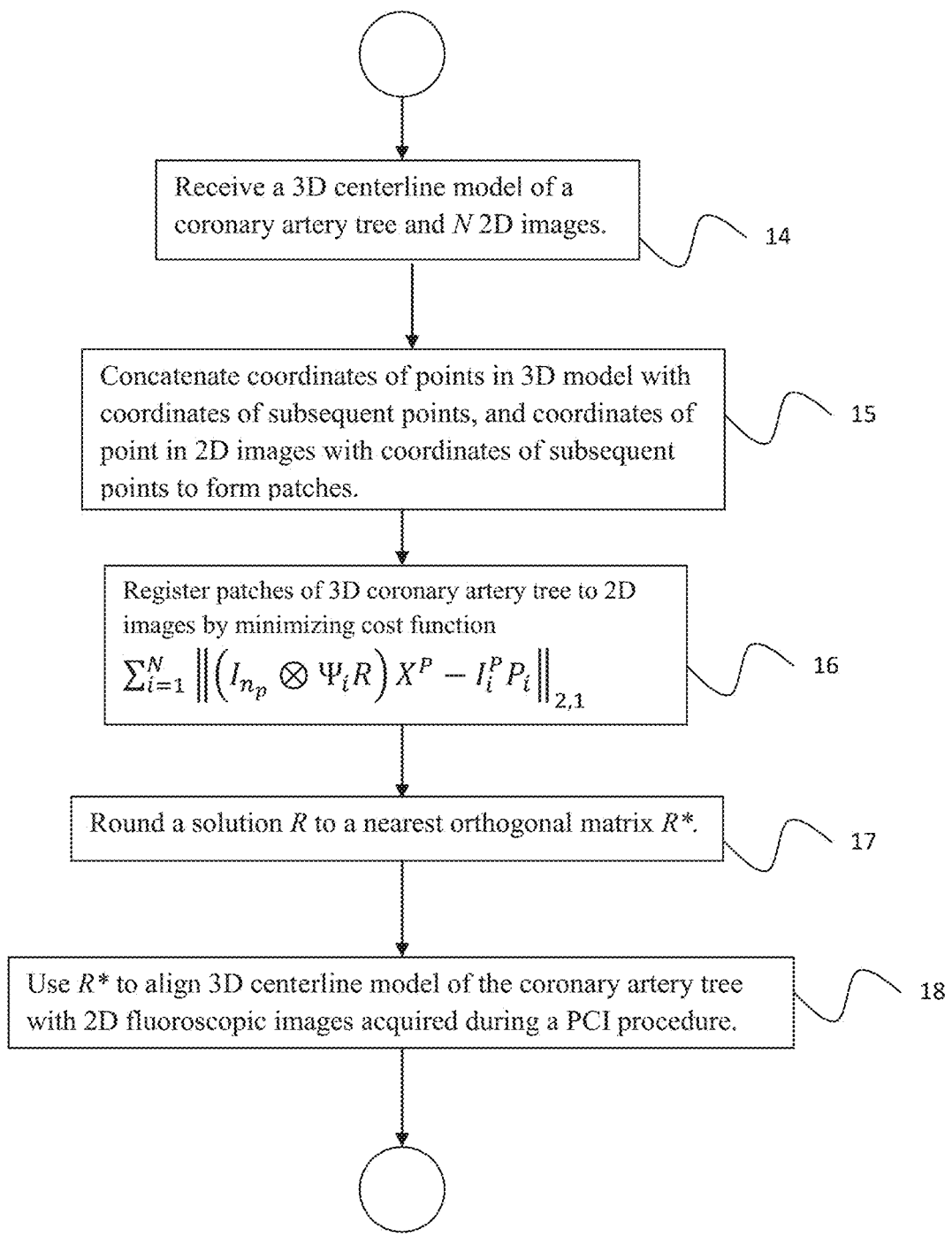

FIG. 1B is a flow chart of a method according to an embodiment of the disclosure of registering patches of a 3D coronary artery tree to patches in 2D images. A method begins at step 14 by receiving the 3D centerline model X of a coronary artery tree with m points and N 2D images $I_i$. As with the point-wise registration case, the registration can be extended from registering the 3D coronary artery tree to two 2D images to registering the 3D coronary artery tree to N 2D images. At step 15, the coordinates of point $j \in X$ are concatenated with coordinates of subsequent points $j+1, \ldots, j+n_p-1$, and coordinates of point $k \in I_i$ are concatenated with coordinates of subsequent points $k+1, \ldots, k+n_p-1$, to form a patches of size $n_p$. The relaxed cost function is minimized at step 16. The cost function may be the relaxed convex cost functions of EQS. (4.1) or (4.2). As above, the cost function need not be restricted to registering the 3D coronary artery tree to two 2D images, but can be extended to register the 3D coronary artery tree to N 2D images, and the cost function of EQ. (4.2) can be extended from one 2D image pair to including M pairs of corresponding 2D images. A solution R is rounded to a nearest orthogonal matrix R* in SO(3), at step 17, and the solution R* can be used at step 18 to align the 3D centerline model X of the coronary artery tree with new 2D fluoroscopic images acquired during a percutaneous coronary intervention procedure.

Experiments

In this section, performance of an algorithm according to an embodiment of the disclosure is evaluated using synthetic data of the heart vessels, and real CT data of six different patients. In particular, simulations show that regardless of the initial pose of a 3D model, an algorithm according to an embodiment of the disclosure recovers the ground truth pose in the case when there is no noise. In the presence of image noise, an algorithm according to an embodiment of the disclosure can return a solution close to the ground truth. These observations are also verified when working with real data. These are enabled by a convex reformulation according to an embodiment of EQS. (1.1) and (1.2), as global optimality is made possible when the task is convex. According to embodiments, to measure the quality of registration, the following measure is used:

$$RMSD = \frac{1}{2\sqrt{m}} \left( \|\Psi_1 R^* X - \Psi_1 \tilde{R} X\|_F + \|\Psi_2 R^* X - \Psi_2 \tilde{R} X\|_F \right).$$

As a reminder, R* is the solution after rounding from EQS. (2.1), (2.2), and $\tilde{R}$ is the ground truth rotation. $\tilde{R}$ is known in the case of synthetic data, and for the case of real data it is manually given by medical experts. The units of RMSD will be in millimeter(mm).

Synthetic Data

Synthetic data can be used to demonstrate the ability of an algorithm according to an embodiment of the disclosure to exactly recover the pose of the 3D model when there is no noise in the image. Bounded noise was also added to each point in the image in the following way:

$$I_{1,j} = \Psi_1(RX_j + \epsilon_{1,j}), I_{2,j} = \Psi_2(RX_j + \epsilon_{2,j}), i \in 1, \ldots, n_1, j \in 1, \ldots, n_2,$$

where $\epsilon_{1,j}, \epsilon_{2,j} \sim U[-\epsilon, \epsilon]^3$ is the uniform distribution in the cube $[-\epsilon, \epsilon]^3$. Simulations show that the quality of the solution gracefully degrades as $\epsilon$ increases. Simulations are performed both in the case when the image captures the complete 3D model, and in the case when there are extra centerlines in the image.

Figure 2:
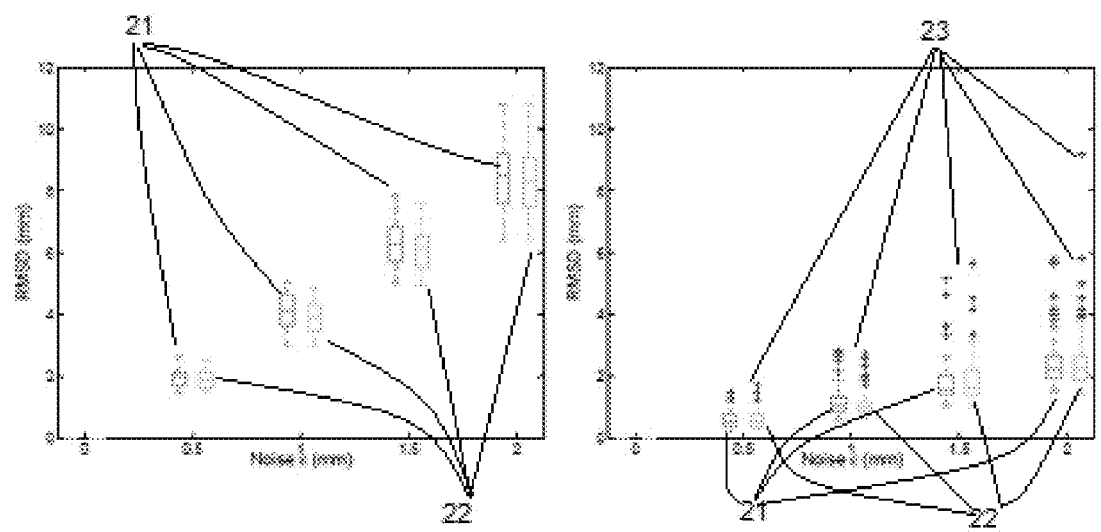
FIG. 2 shows results of two convex programs according to embodiments of the disclosure when the images are the projection of the complete 3D model, and results after OGMM refinement.
Figure 3:
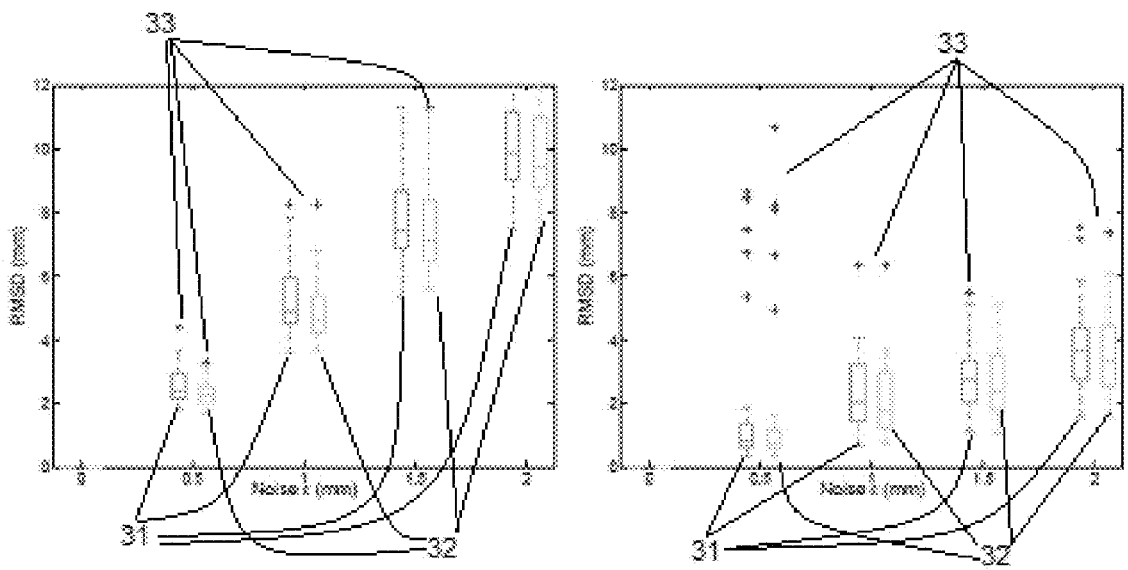
FIG. 3 shows results of two convex programs according to embodiments of the disclosure when the images contain the projections of the 3D model as a proper subset, and results after OGMM refinement.

An algorithm according to an embodiment of the disclosure is compared with a recent 2D/3D registration algorithm OGMM, disclosed above. Although the implementation of the OGMM is publicly available, it only considers the setting when there is only one image. Therefore a version was implemented using Gaussian mixtures with each individual Gaussian distribution being isotropic. Hence the results reported herein does not represent faithfully the full power of OGMM. However, there are situations where OGMM needs a good initialization to converge, and an algorithm according to an embodiment of the disclosure can provide a high quality starting point. In the simulations, the 3D model of coronary vessel is first rotated into an arbitrary posture and then projected in two fixed orthogonal directions. The 3D model may deviate 15° from the head-to-feet axis, which is defined as the z-axis. The 3D heart model is then systematically rotated around z-axis. An algorithm according to an embodiment of the disclosure is systematically tested when rotation R in the above equations around z-axis is within each of the ranges [0°, 10°], [10°, 20°], [20°, 40°], [40° 60°], and [60°, 90°], using 10 different noise realizations in each case. The results of the convex programs are shown in the FIG. 2 (left) and FIG. 3 (left). FIG. 2 shows results of two convex programs according to embodiments when the images are the projection of the complete 3D model (left), and results after OGMM refinement (right). FIG. 3 shows results of two convex programs according to embodiments when the images contain the projections of the 3D model as a proper subset (left), and results after OGMM refinement (right). In FIGS. 2 and 3, box-plots 21(31) indicate results from EQS. 1.1 and 2.1, box-plots 22(32) indicate results from EQS. 1.2 and 2.2, and crosses 23(33) indicate results outside the 3 standard deviations represented by the whiskers of the box plot. For each noise level, 50 experiments were performed with different poses of the 3D model, with rotation ranging from 0° to 90°. It is not surprising that regardless of the position of the 3D pose, the rotation can be recovered in a consistent manner in a convex formulation according to an embodiment of the disclosure, as an algorithm according to an embodiment can provide a globally optimal solution. For both programs, the RMSD increases in a stable manner as the noise $\epsilon$ increases from 0 mm to 2 mm. Both convex programs, EQS. (2.1), (2.2) have very similar performances. If the solution of a convex program according to an embodiment is used to initialize OGMM, high quality results can be obtained, as shown in FIG. 2 (right) and FIG. 3 (right). When OGMM is used, the Gaussian variance is set to $(3\epsilon)^2$.

Figure 4:
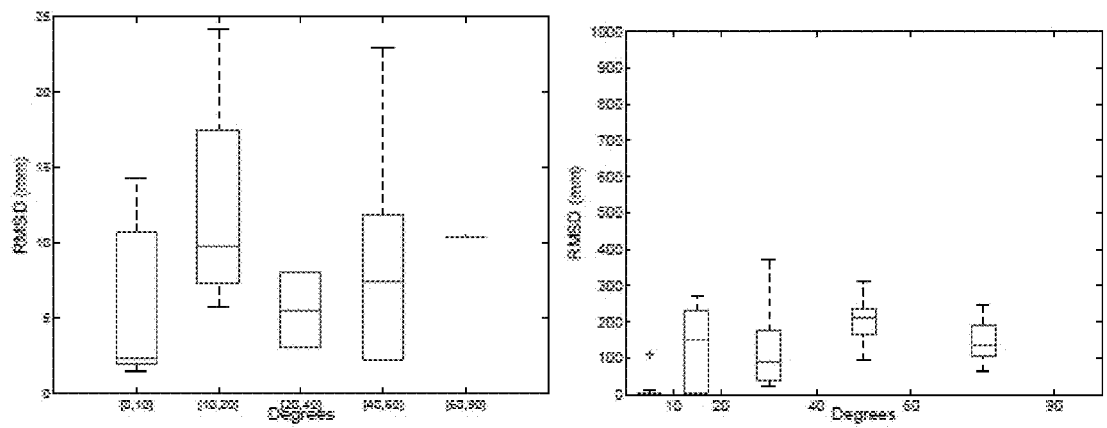
FIG. 4 shows box-plots of results when using OGMM alone in the case when the images are the projection of the complete 3D model, when the images contain the projections of the 3D model as a proper subset, according to an embodiment of the disclosure.

The RMSD gradually increases as the noise increases. It should be noted that these results need a first estimate of the pose using an algorithm according to an embodiment. If OGMM is used alone, using the identity as an initialization, the recovery of the pose is not guaranteed unless the initializations are in the [0°, 10°] range. In fact for most experiment, a solution cannot be found within 25 mm RMSD. The results from OGMM are shown in FIG. 4, where the RMSD is plotted against different 3D poses. FIG. 4 shows box-plots of results when using OGMM alone in the case when the images are the projection of the complete 3D model (left), when the images contain the projections of the 3D model as a proper subset (right). The line in the box represents the mean value. The noise level is fixed at $\epsilon$=1:5 mm for this simulation. Here the cases when OGMM finds a solution within 25 mm RMSD are plotted. For the left figure, 19 out of 50 experiments have solutions within 25 mm RMSD. For the right figure, 14 out of 50 experiments have solutions within 25 mm RMSD. If for a particular rotation range there is no boxplot, it means no solution has less than 25 mm RMSD for that range. Again, there are many ways one can improve on an implementation of OGMM according to an embodiment in terms of radius of convergence. Nevertheless, an algorithm according to an embodiment of the disclosure can bridge the gap in cases when local optimizer is still far from the global optimum.

Real Data

Figure 5:
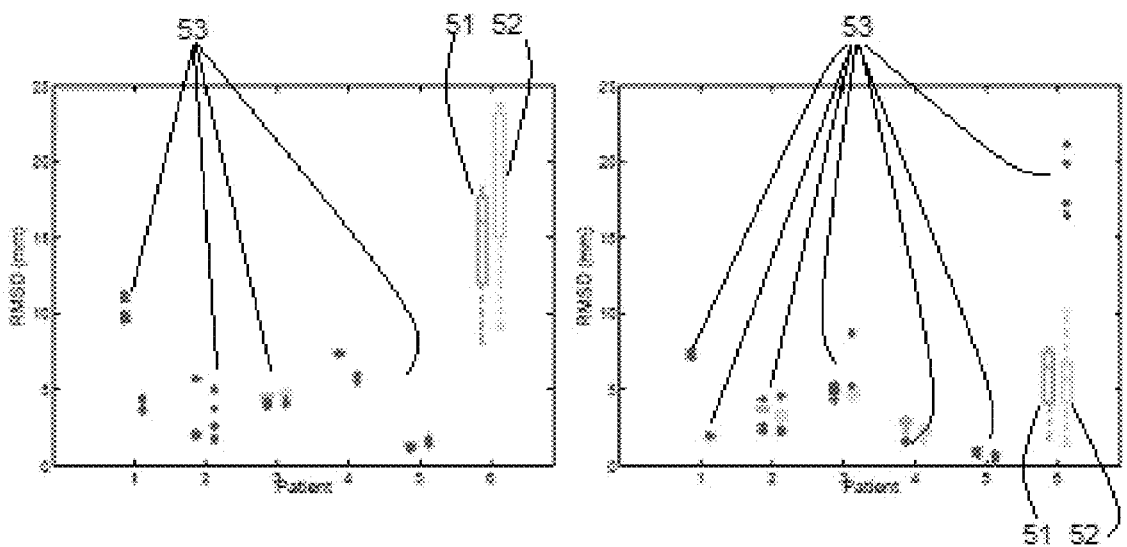
FIG. 5 is a table that presents results of experiments with RMSD within 10 mm on 6 real data sets when using OGMM alone, according to an embodiment of the disclosure.

An algorithm according to an embodiment of the disclosure was tested on six sets of real data. First, the translation was manually removed, and the heart was posed with arbitrary rotations within the ranges [0°, 10°], [10°, 20°], [20°, 40°], [40°, 60°], and [60°, 90°]. For each rotation range, 10 different instances are generated. The results are detailed in FIG. 5, which shows results using the two convex programs for data of 6 patients (left) and results after an OGMM refinement (right). In FIG. 5, box-plots 51 indicate results from EQ. 1.1, box-plots 52 indicate results from EQS. 1.2, and crosses 53 indicate results outside the 3 standard deviations represented by the whiskers of the box plot.

Figure 7:
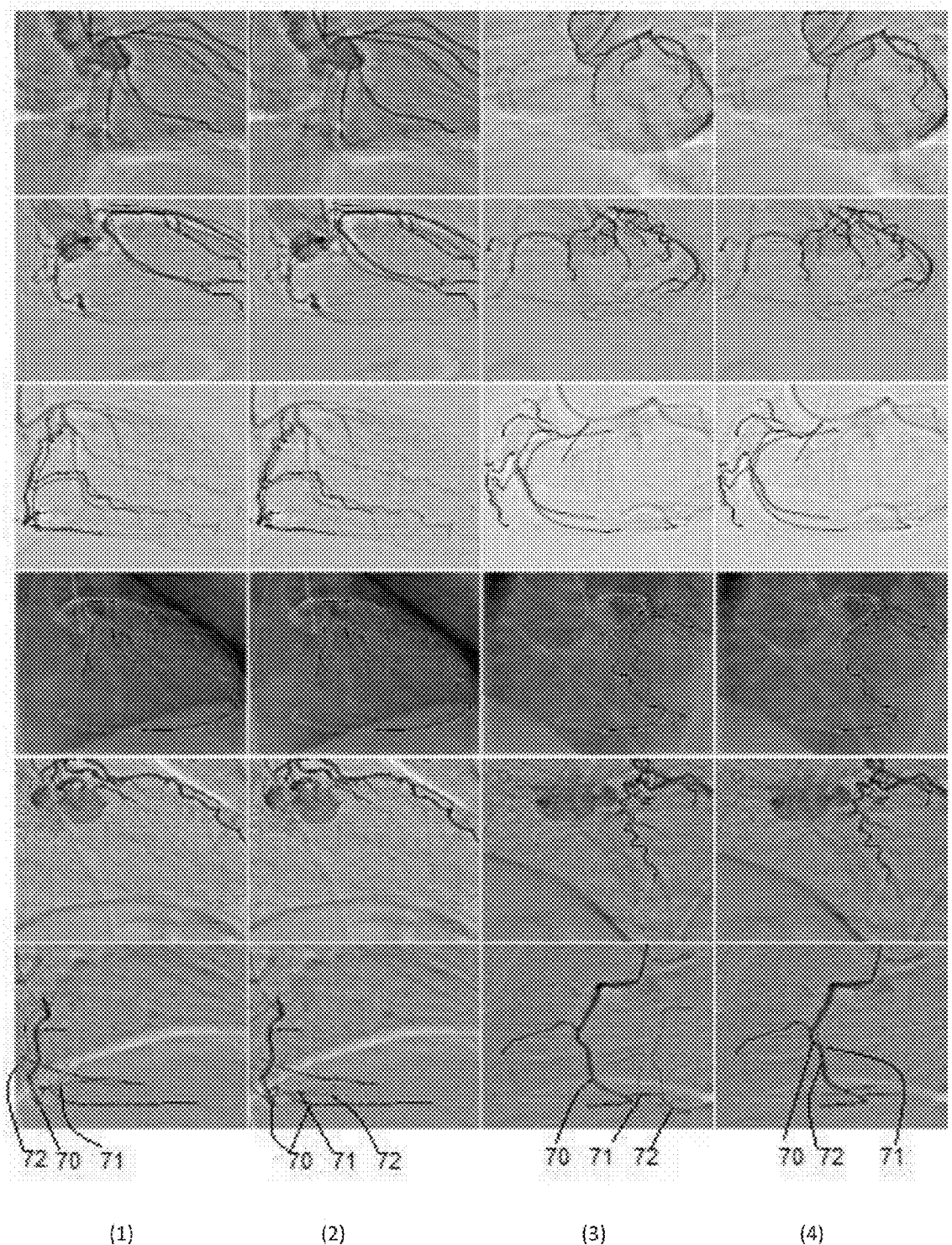
FIG. 7 depicts images of a 3D model after 2D/3D registration, according to an embodiment of the disclosure.

Results of an algorithm according to an embodiment are compared with results from OGMM. Table 1, shown in FIG. 6, presents results of experiments with RMSD within 10 mm on 6 real data sets when using OGMM alone. The number in bracket is the median of the RMSD for the solutions within 10 mm RMSD. Table 1 shows that except for smaller than 20° rotation, RMSD cannot be obtained within 10 mm just using OGMM. On the other hand, FIG. 6 shows that the pose can be recovered to within 10 mm for most cases, either before or after OGMM refinement. Images of the 3D model after the 2D/3D registration are depicted in FIG. 7. In FIG. 7, each row is the registration results for a single patient presented in two different viewing directions. The black lines 70 are the segmented vessel centerline in the X-ray images. In columns 1 and 3, the lines 71 denote the 3D model posed by R* from EQ. (2.1), and the lines 72 denote the 3D model posed by R* from EQ. (2.2). In columns 2 and 4, the lines 71 denote the 3D model posed by R* from EQ. (2.1)+OGMM, and the lines 72 denote the 3D model posed by R* from EQ. (2.2)+OGMM.

Discussion

A program according to an embodiment of the disclosure can find the correspondence and transformation between two degenerate point clouds obtained by projection of a 3D model and the model itself. Under certain conditions, a relaxed convex version of a program according to an embodiment converges to recover the solution of the original NP-hard program. Another program according to an embodiment of the disclosure can solve a variant where a-priori information on the estimated correspondence between degenerate point clouds is exploited. Such estimate of correspondence could come from feature matching or known epipolar constraints. Further embodiments consider additional descriptors and features attached to a particular point. Embodiments can incorporate either transformation invariant features or features that transform according to rotation, such a tangent of the vessel derived from a neighborhood patch.

Algorithms according to embodiments of the disclosure were evaluated using synthetic data, and with the addition of uniformly distributed bounded noise to the simulated data set. Cases where the projected image fully captures the 3D model and cases when there are extra centerlines in the image were simulated. These mimic the clinical scenario where a coronary of interest is completely occluded and there may be surgical tools and devices such as catheters that have a similar appearance as that of a contrast filled vessel captured in the image. It was found that under such conditions, using local optimization programs alone, and starting at identity rotation, the recovery of the pose is not guaranteed unless it is in 0-10 degree range from the optimal solution. In fact, for most experiments a solution cannot be found that converges to within 25 mm RMS error. However, there are ways one can improve on the implementations of local optimizers in terms of range of convergence by using methods such as annealing.

In addition, experiments using multiple X-ray biplane angiography frames have also been presented. The validation was performed by perturbing the original pose by a random pose in a wide range of values. The pose and the correspondence can be recovered to within 10 mm RMS error in most cases. An algorithm according to an embodiment of the disclosure can be used alone to provide recovery of transformation and correspondence or as a pre-processing step to provide a high quality starting point for a local registration algorithm such as OGMM.

System Implementations

It is to be understood that the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

Figure 8:
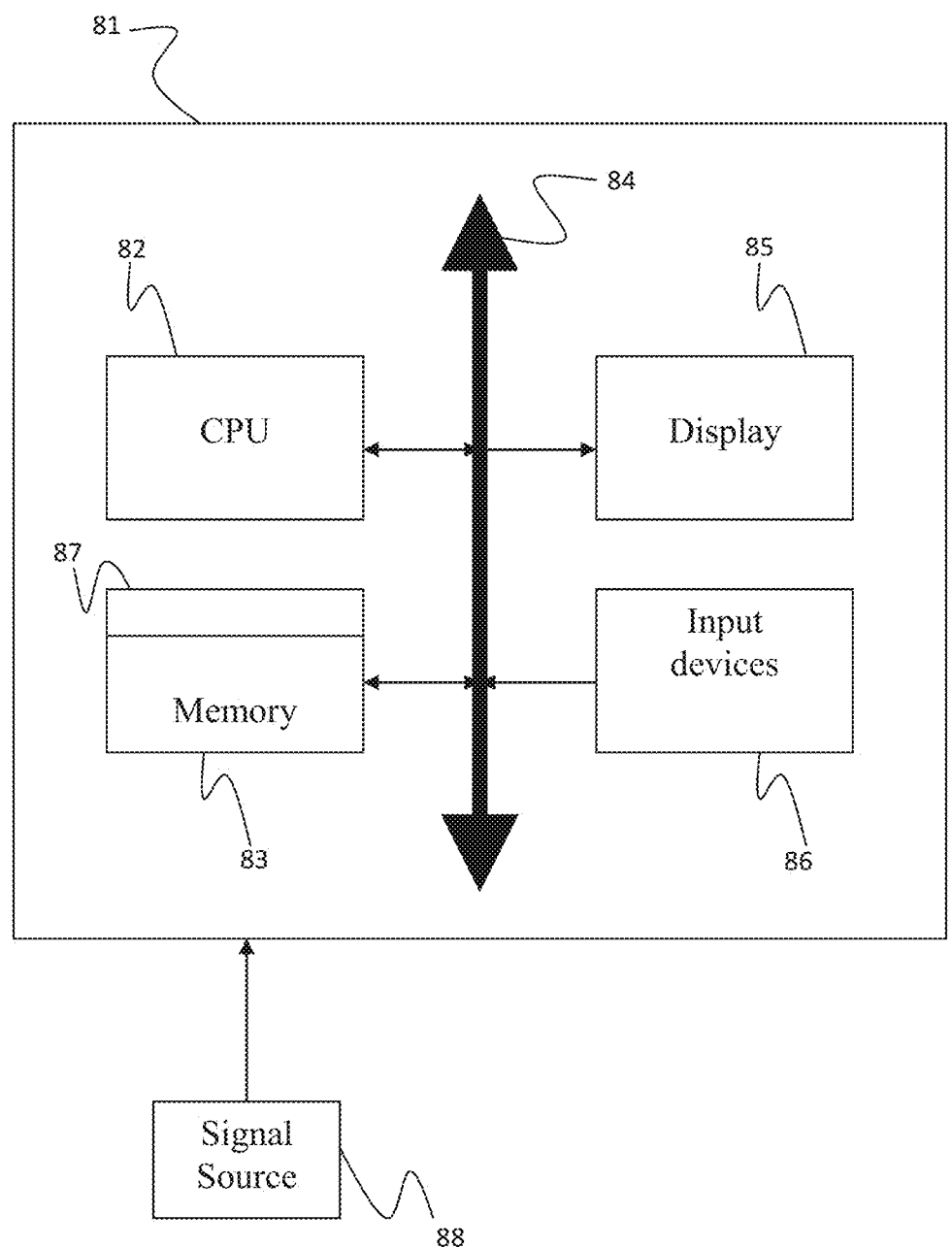
FIG. 8 is a block diagram of a system for implementing a method for 2D/3D registration based on a convex optimization program according to an embodiment of the disclosure.

FIG. 8 is a block diagram of an exemplary computer system for implementing a method for 2D/3D registration based on a convex optimization program according to an embodiment of the disclosure. Referring now to FIG. 8, a computer system 81 for implementing the present disclosure can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present disclosure can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present disclosure.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer implemented method of registering a 3-dimensional (3D) model of a coronary artery tree with two or more 2-dimensional (2D) images, the method executed by a computer comprising the steps of:
solving for matrices R, $P_i$, i=1, ..., N, that minimize a cost function $\Sigma_{i=1}^{N}\|\Psi_i RX - I_i P_i\|_{2,1}$ subject to constraints that $R \in conv(SO(3))$, $P_i \in [0,1]^{n_i \times m}$, and $P_i 1 \leq 1$, $1^T P_i = 1$, for $i \in \{1, N\}$,
wherein N is a number of 2D images, R is a rotation matrix, conv(SO(3)) denotes a convex hull of the special orthogonal group in 3 dimensions, X denotes a 3D centerline model of a coronary artery tree with m points, $I_i$ denotes the ith 2D image with $n_i$ points, $\Psi_i$ denotes a transformation between the 3D centerline model X and the ith 2D image $I_i$, 1 is an all-ones vector, $P_i$ is a permutation matrix whose values represent a probability of a point in the ith 2D image $I_i$ corresponding to a point in the 3D centerline model X, and the subscript 2,1 refers to a mixed $l^2/l_1$ norm; and
rounding a solution R to a nearest orthogonal matrix R* in SO(3);
wherein R* aligns the 3D centerline model X of the coronary artery tree with 2D fluoroscopic images acquired during a percutaneous coronary intervention procedure.

2. The method of claim 1, wherein rounding a solution R to a nearest orthogonal matrix R* in SO(3) comprises finding a matrix R* in SO(3) that solves
$argmin_{R \in O(3)} \|R - \tilde{R}\|_F^2$, wherein $\tilde{R}$ is an optimal rotation in conv(SO(3)), O(3) denotes the orthogonal group in 3D, and the subscript F denotes a Frobenius norm.

3. The method of claim 1, wherein the cost function includes terms $\|X^F - I_i^F P_i\|_{2,1}$, for i=1, ..., N, wherein $X^F$ denotes a d×m real matrix that represents a d-dimensional transformation invariant feature, and $I_i^F$ denotes a d×$n_i$ image.

4. The method of claim 1, wherein the cost function includes terms $\|\Psi_i R X^F - I_i^F P_i\|_{2,1}$ for i=1, ..., N, wherein $X^F$ denotes a d×m real matrix that represents a d-dimensional transformation invariant feature, and $I_i^F$ denotes a d×$n_i$ image.

5. The method of claim 1, wherein the cost function includes a term $\Sigma_{ab=1}^{M}\|P_{ab} - \hat{P}_{ab}\|_1$, wherein $\hat{P}_{ab}$ denotes a correspondence of points between 2D images $I_a$ and $I_b$ where $\hat{P}_{ab}(i,j) = 1$ if point $i \in I_a$ corresponds to point $j \in I_b$ and zero otherwise, $P_{ab}$ is a permutation matrix that relates the points of images $I_a$ and $I_b$ for M image pairs, and $\| \|_1$ is an entry-wise $l^1$ norm,
subject to additional constraints $P_{ab} \in [0, 1]^{n_a \times n_b}$, $P_{ab} 1 \leq 1$, $1^T P_{ab} \leq 1$, and $\begin{bmatrix} I_{n_a} & P_{ab} & P_a \\ P_{ab}^T & I_{n_b} & P_b \\ P_a^T & P_b^T & I_m \end{bmatrix} \succeq 0.$ 6. The method of claim 1, further comprising using a solution for the cost function as an initialization to search locally for a more optimal solution.

7. A computer implemented method of registering a 3-dimensional (3D) model of a coronary artery tree with two or more 2-dimensional (2D) images, the method executed by a computer comprising the steps of:
receiving a 3D centerline model X of a coronary artery tree with m points and N 2D images $I_i$, i=1, ..., N, each with $n_i$ points;
concatenating coordinates of point $j \in X$ with coordinates of subsequent points j+1, ..., j+$n_p$-1, and coordinates of point $k \in I_i$ with coordinates of subsequent points k+1, ..., k+$n_p$-1, to form a patches of size $n_p$, wherein results of the concatenations are denoted as $X_i^P$, $I_1^P$ and $I_2^P$ and stored as an i-th column of matrices $X^P \in R^{3n_p \times m}$ and $I_i \in R^{3n_p \times n_i}$, i=1, ..., N, wherein R is the set of real numbers;
solving for matrices R, $P_i$, i=1, ..., N, that minimize a cost function $\Sigma_{i=1}^{N}\|(I_{n_p} \otimes \Psi_i R) X^P - I_i^P P_i\|_{2,1}$ subject to constraints that $R \in conv(SO(3))$, $P_i \in [0,1]^{n_i \times m}$, and $P_i 1 \leq 1$, $1^T P_i = 1$, for $i \in \{1, N\}$, wherein $\otimes$ denotes a Kronecker product, R is a rotation matrix, conv(SO(3)) denotes a convex hull of the special orthogonal group in 3 dimensions, $\Psi_i$ denotes a transformation between $X^P$ and $I_i^P$, 1 is an all-ones vector, $P_i$ is a permutation matrix whose values represent a probability of a point in $I_i^P$ corresponding to a point in $X^P$, and the subscript 2,1 refers to a mixed $l^2/l_1$ norm; and rounding a solution R to a nearest orthogonal matrix R* in SO(3), wherein R* aligns the 3D centerline model X of the coronary artery tree with 2D fluoroscopic images acquired during a percutaneous coronary intervention procedure.

8. The method of claim 7, wherein rounding a solution R to a nearest orthogonal matrix R* in SO(3) comprises finding a matrix R* in SO(3) that solves $\mathrm{argmin}_{R \in O(3)} \|R - \tilde{R}\|_F^2$, wherein $\tilde{R}$ is an optimal rotation in conv(SO(3)), O(3) denotes the orthogonal group in 3D, and the subscript F denotes a Frobenius norm.

9. The method of claim 7, wherein $n_p=3$.

10. The method of claim 7, wherein the cost function includes a term $\Sigma_{ab=1}^M \|P_{ab} - \hat{P}_{ab}\|_1$, wherein $\hat{P}_{ab}$ denotes a correspondence of points between 2D images $I_a$ and $I_b$ where $\hat{P}_{ab}(i,j)=1$ if point $i \in I_a$ corresponds to point $j \in I_b$ and zero otherwise, $P_{ab}$ is a permutation matrix that relates the points of images $I_a$ and $I_b$ for M image pairs, and $\|\ \|_1$ is an entry-wise $l^1$ norm, subject to additional constraints $P_{ab} \in [0,1]^{n_a \times n_b}$, $P_{ab} 1 \le 1, 1^T P_{ab} \le 1$, and $\begin{bmatrix} I_{n_a} & P_{ab} & P_a \\ P_{ab}^T & I_{n_b} & P_b \\ P_a^T & P_b^T & I_m \end{bmatrix} \succcurlyeq 0.$ 11. The method of claim 7, further comprising, if the point spacing differs between X and $I_i$, projecting a randomly posed 3D model using $\Psi_i$, calculating an average spacing between two subsequent points in the projection, and sampling image points in $I_i$ according to this spacing.

12. A non-transitory program storage device readable by a computer, tangibly embodying a program of instructions executed by the computer to perform the method steps for registering a 3-dimensional (3D) model of a coronary artery tree with two or more 2-dimensional (2D) images, the method comprising the steps of:

solving for matrices R, $P_i$, i=1, ..., N, that minimize a cost function $\Sigma_{i=1}^N \|\Psi_i R X - I_i P_i\|_{2,1}$ subject to constraints that $R \in \mathrm{conv}(SO(3))$, $P_i \in [0,1]^{n_i \times m}$, and $P_i 1 \le 1$, $1^T P_i = 1$, for $i \in \{1, N\}$, wherein N is a number of 2D images, R is a rotation matrix, conv(SO(3)) denotes a convex hull of the special orthogonal group in 3 dimensions, X denotes a 3D centerline model of a coronary artery tree with m points, $I_i$ denotes the ith 2D image with $n_i$ points, $\Psi_i$ denotes a transformation between the 3D centerline model X and the ith 2D image $I_i$, 1 is an all-ones vector, $P_i$ is a permutation matrix whose values represent a probability of a point in the ith 2D image $I_i$ corresponding to a point in the 3D centerline model X, and the subscript 2,1 refers to a mixed $l^2/l_1$ norm; and rounding a solution R to a nearest orthogonal matrix R* in SO(3);

wherein R* aligns the 3D centerline model X of the coronary artery tree with 2D fluoroscopic images acquired during a percutaneous coronary intervention procedure.

13. The computer readable program storage device of claim 12, wherein rounding a solution R to a nearest orthogonal matrix R* in SO(3) comprises finding a matrix R* in SO(3) that solves $\mathrm{argmin}_{R \in O(3)} \|R - \tilde{R}\|_F^2$, wherein $\tilde{R}$ is an optimal rotation in conv(SO(3)), O(3) denotes the orthogonal group in 3D, and the subscript F denotes a Frobenius norm.

14. The computer readable program storage device of claim 12, wherein the cost function includes terms $\|X^F - I_i^F P_i\|_{2,1}$, for i=1, ..., N, wherein $X^F$ denotes a d×m real matrix that represents a d-dimensional transformation invariant feature, and $I_i^F$ denotes a d×$n_i$ image.

15. The computer readable program storage device of claim 12, wherein the cost function includes terms $\|\Psi_i R X^F - I_i^F P_i\|_{2,1}$ for i=1, ..., N, wherein $X^F$ denotes a d×m real matrix that represents a d-dimensional transformation invariant feature, and $I_i^F$ denotes a d×$n_i$ image.

16. The computer readable program storage device of claim 12, wherein the cost function includes a term $\Sigma_{ab=1}^M \|P_{ab} - \hat{P}_{ab}\|_1$, wherein $\hat{P}_{ab}$ denotes a correspondence of points between 2D images $I_a$ and $I_b$ where $\hat{P}_{ab}(i,j)=1$ if point $i \in I_a$ corresponds to point $j \in I_b$ and zero otherwise, $P_{ab}$ is a permutation matrix that relates the points of images $I_a$ and $I_b$ for M image pairs, and $\|\ \|$ is an entry-wise $l^1$ norm, subject to additional constraints $P_{ab} \in [0,1]^{n_a \times n_b}$, $P_{ab} 1 \le 1, 1^T P_{ab} \le 1$, and $\begin{bmatrix} I_{n_a} & P_{ab} & P_a \\ P_{ab}^T & I_{n_b} & P_b \\ P_a^T & P_b^T & I_m \end{bmatrix} \succcurlyeq 0.$ 17. The computer readable program storage device of claim 12, the method further comprising using a solution for the cost function as an initialization to search locally for a more optimal solution.

18. A non-transitory program storage device readable by a computer, tangibly embodying a program of instructions executed by the computer to perform the method steps for registering a 3-dimensional (3D) model of a coronary artery tree with two or more 2-dimensional (2D) images, the method comprising the steps of:

receiving a 3D centerline model X of a coronary artery tree with m points and N 2D images $I_i$, i=1, ..., N, each with $n_i$ points;

concatenating coordinates of point $j \in X$ with coordinates of subsequent points j+1, ..., j+$n_p$-1, and coordinates of point $k \in I_i$ with coordinates of subsequent points k+1, ..., k+$n_p$-1, to form a patches of size $n_p$, wherein results of the concatenations are denoted as $X_i^P$, $I_1^P$ and $I_2^P$ and stored as an i-th column of matrices $X^P \in \mathbb{R}^{3n_p \times m}$ and $I_i \in \mathbb{R}^{3n_p \times n_i}$, i=1, ..., N, wherein $\mathbb{R}$ is the set of real numbers;

solving for matrices R, $P_i$, i=1, ..., N, that minimize a cost function $\Sigma_{i=1}^N \|(I_{n_p} \otimes \Psi_i R) X^P - I_i^P P_i\|_{2,1}$ subject to constraints that $R \in \mathrm{conv}(SO(3))$, $P_i \in [0,1]^{n_i \times m}$, and $P_i 1 \le 1$, $1^T P_i = 1$, for $i \in \{1, N\}$, wherein $\otimes$ denotes a Kronecker product, R is a rotation matrix, conv(SO(3)) denotes a convex hull of the special orthogonal group in 3 dimensions, $\Psi_i$ denotes a transformation between $X^P$ and $I_i^P$, 1 is an all-ones vector, $P_i$ is a permutation matrix whose values represent a probability of a point in $I_i^P$ corresponding to a point in $X^P$, and the subscript 2,1 refers to a mixed $l^2/l_1$ norm; and rounding a solution R to a nearest orthogonal matrix R* in SO(3), wherein R* aligns the 3D centerline model X of the coronary artery tree with 2D fluoroscopic images acquired during a percutaneous coronary intervention procedure.

19. The computer readable program storage device of claim 18, wherein rounding a solution R to a nearest orthogonal matrix R* in SO(3) comprises finding a matrix R* in SO(3) that solves $\text{argmin}_{R \in O(3)} \|R - \tilde{R}\|_F^2$, wherein $\tilde{R}$ is an optimal rotation in conv(SO(3)), O(3) denotes the orthogonal group in 3D, and the subscript F denotes a Frobenius norm.

20. The computer readable program storage device of claim 18, wherein the cost function includes a term $\Sigma_{ab=1}^{M} \|P_{ab} - \hat{P}_{ab}\|_1$, wherein $\hat{P}_{ab}$ denotes a correspondence of points between 2D images $I_a$ and $I_b$ where $\hat{P}_{ab}(i,j)=1$ if point $i \in I_a$ corresponds to point $j \in I_b$ and zero otherwise, $P_{ab}$ is a permutation matrix that relates the points of images $I_a$ and $I_b$ for M image pairs, and $\| \ \|_1$ is an entry-wise $l^1$ norm, subject to additional constraints $$P_{ab} \in [0,1]^{n_a \times n_b},$$

$$P_{ab} 1 \leq 1, 1^T P_{ab} \leq 1, \text{ and}$$

$$\begin{bmatrix} I_{n_a} & P_{ab} & P_a \\ P_{ab}^T & I_{n_b} & P_b \\ P_a^T & P_b^T & I_m \end{bmatrix} \succcurlyeq 0.$$

21. The computer readable program storage device of claim 18, further comprising, if the point spacing differs between X and $I_i$, projecting a randomly posed 3D model using $\Psi_i$, calculating an average spacing between two subsequent points in the projection, and sampling image points in $I_i$ according to this spacing.

* * * * *

UNITED STATES PATENT AND TRADEMARK OFFICE
CERTIFICATE OF CORRECTION

PATENT NO. : 9,646,361 B2  
APPLICATION NO. : 14/965144  
DATED : May 9, 2017  
INVENTOR(S) : Yuehaw Khoo et al.

Page 1 of 1

It is certified that error appears in the above-identified patent and that said Letters Patent is hereby corrected as shown below:

On the Title Page

At (72), "Inventors: Yuehaw Koo, Princeton, NJ (US); Ankur Kapoor, Plainsboro, NJ (US)" should be replaced with --Inventors: Yuehaw Khoo, Princeton, NJ (US); Ankur Kapoor, Plainsboro, NJ (US)--.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*